Patented July 24, 1934

1,967,863

UNITED STATES PATENT OFFICE 1,967,863

COATED MATERIAL AND METHOD OF MAKING SAME

Arnold M. Collins and Louis L. Larson, Wilmington, Del., assignors to E. I. du Pont de Nemours & Company, Wilmington, Del., a corporation of Delaware No Drawing. Application November 2, 1931, Serial No. 572,727. Renewed May 2, 1934

39 Claims. (Cl. 91—68)

This invention relates to the art of impregnating and coating, and in particular it relates to the coating, impregnating, and finishing of fabrics and similar porous and bibulous articles with compositions containing polymers of chloro-2-butadiene-1,3.

Prior art

The preparation of chloro-2-butadiene-1,3 and related halogen-substituted dienes and polymers of these compounds is described in the pending applications of W. H. Carothers and A. M. Collins, Serial No. 409,538, filed October 22, 1930, and Serial No. 519,243, filed February 28, 1931; W. H. Carothers, A. M. Collins and J. E. Kirby, Serial Nos. 519,241 and 519,242, filed February 28, 1931; W. H. Carothers and J. E. Kirby, Serial No. 535,577, filed May 6, 1931; Ira Williams, Serial No. 519,244, filed February 28, 1931; and A. M. Collins, Serial No. 537,484, filed May 14, 1931.

Objects of the invention

An object of the invention relates to the provision of materials which have been modified by treatment with chloro-2-butadiene-1,3 polymer. A more specific object relates to the treatment of fabric and fibrous materials with solutions or dispersions of chloro-2-butadiene-1,3 polymer. Such treated materials have improved strength and insulating properties, are resistant to the action of water and solvents such as gasolene and other mineral oils, and have wide application in the industries.

Other objects of the invention will become apparent from the following detailed description of the invention.

Description of the invention

The objects of the invention are accomplished by impregnating or coating materials with compositions containing chloro-2-butadiene-1,3 polymers which are in the form of plastic masses, solutions or aqueous dispersions. For this purpose, we may use any of the plastic, incompletely polymerized chloro-2-butadiene-1,3 polymers or any of the dispersions of a completely polymerized chloro-2-butadiene-1,3 disclosed in the various co-pending applications referred to above.

A typical mode of preparing aqueous dispersions of chloro-2-butadiene-1,3 polymers is illustrated in the following example:

Example A

Fresh chloro-2-butadiene-1,3 is added slowly with vigorous mechanical stirring to an equal weight of 2% aqueous solution of sodium oleate. When the chloro-2-butadiene-1,3 is all added and completely emulsified, the emulsion is stored at 10° C. for 24 to 48 hours. At the end of this period, the polymerization of chloro-2-butadiene-1,3 is substantially complete and a fine dispersion of completely polymerized insoluble chloro-2-butadiene-1,3 polymer results. Enough ammonium hydroxide is then added to render this suspension slightly alkaline. It is then ready for use in the formulation of impregnating and coating compositions. Antioxidants may be incorporated at this point, for instance, 1% of phenyl-beta-naphthylamine based on the weight of the polymer may be incorporated by first dispersing it by grinding in a ball mill with a small volume of water containing sodium oleate, and then mixing the resulting dispersion with the dispersion of chloro-2-butadiene-1,3 polymer.

The specific examples, hereinafter described, which relate to impregnation or coating by means of aqueous dispersions of chloro-2-butadiene-1,3 polymer make use of the dispersions prepared in a manner similar to that described in Example A, but it will be understood that any dispersion prepared according to the procedure described in the Collins application, Serial No. 537,484 above referred to, may be used in lieu thereof.

The plastic soluble chloro-2-butadiene-1,3 polymers, used in many of the specific examples given below, is prepared as follows:

Example B

Freshly distilled chloro-2-butadiene-1,3 is exposed in a closed glass bottle to a mercury vapor lamp operating in pyrex glass, for 48 to 72 hours at room temperature. Two per cent phenyl-beta-naphthylamine is added to the resulting viscous syrup and the unpolymerized chloro-2-butadiene-1,3 is removed by distillation in vacuo with vigorous mechanical stirring. The semi-solid chloro-2-butadiene-1,3 polymer remaining is then dissolved in toluene or xylene and used in the formulation of the impregnating or coating compositions.

Plastic chloro-2-butadiene-1,3 polymer prepared according to the method illustrated in Example B has been utilized, except where specified to the contrary, in each of the following examples which relate to coating or impregnating with a plastic polymer or solution of the same. However, plastic polymers prepared according to the methods disclosed in Williams' application Serial No. 519,244 referred to above, are generally useful for the same purposes and may be substituted for that prepared according to Example B.

Solutions of the plastic polymers prepared as described above may be made by dissolving the plastic polymers in suitable aromatic hydrocarbon or chlorinated aliphatic or aromatic hydrocarbon solvents such as benzene, toluene, xylene, carbon tetrachloride, chlorobenzene, etc. Esters such as ethyl acetate and butyl acetate may be used for the same purpose. Small amounts of aliphatic hydrocarbons and alcohols may also be used in the solvent mixture although they are themselves not solvents for the polymers. Polymer solutions suitable for the purposes of this invention may also be prepared by polymerizing chloro-2-butadiene-1,3 in the presence of a solvent as disclosed by Carothers, Collins and Kirby in application Serial No. 519,242.

A. *Impregnating with chloro-2-butadiene-1,3 polymers*

The teachings of the invention may be applied very effectively to the impregnation of porous or fibrous materials with chloro-2-butadiene-1,3. Impregnation, as distinguished from mere coating, effects a penetration or diffusion of the impregnating polymer-containing medium throughout the body of material being impregnated, thereby effecting the adsorption of substantial quantities of polymer in the individual pores and on the individual fibres of the material.

By the use of solutions and dispersions of chloro-2-butadiene-1,3 polymers, it is possible to effect a thorough impregnation of porous materials such as paper, cloth, and fabrics in general, with improvements in the utility of such materials for many purposes. Thus in accordance with this invention, these materials may be made oil-resistant and waterproof or water-repellent and may be much increased in strength without becoming stiff. The process of the present invention therefore has distinct advantages over those now known to the art. Thus, impregnation with natural rubber latex does not impart oil resistance or a high degree of waterproofness, while many impregnating agents cause an undesirable stiffness. Furthermore, solutions of polymers of chloro-2-butadiene-1,3 are much more concentrated than those of natural rubber when compared at working viscosities and hence the former allow the introduction of more impregnating material, in addition to bringing about an economy of solvent. In addition, the plastic polymers of chloro-2-butadiene-1,3 require a much shorter time for curing and are not damaged by over-curing as is the case with natural rubber. Impregation of fibres, fabrics and the like with chloro-2-butadiene-1,3 polymer has a wide application in (1) the preparation of strong, pliable, paper backings; (2) the production of a strong, pliable paper that can be coated with pyroxylin or rubber compositions and subsequently embossed; (3) the preparation of waterproof paper; (4) the preparation of transparent paper; (5) the preparation of oil-resistant paper; (6) the preparation of waterproof and cleanable woven fabrics; (7) the preparation of fabrics of improved oil-resistance; and for many related purposes.

The following examples illustrate the application of chloro-2-butadiene-1,3 polymers for impregnation purposes.

I. *Impregnation of papers with chloro-2-butadiene-1,3 polymer*

Chloro-2-butadiene-1,3 polymers are particularly suitable for the impregnation of various species of paper.

One type of paper beneficially treated in this fashion is a paper prepared from kraft pulp, the individual cellulose fibers of which have been artificially crinkled before, during or after sheeting, for example by treatment with caustic alkali solution, according to the processes disclosed in U. S. Patent No. 1,791,248 to G. L. Schwartz, and U. S. Application Ser. No. 283,445, filed June 6, 1928 to F. H. McCormick and G. L. Schwartz. This type of paper will hereinafter be referred to as crinkled kraft paper.

(a) *Absorbent and pliable papers*

Example 1.—*Crinkled kraft paper treated with chloro-2-butadiene-1,3 polymer*

Crinkled kraft paper is impregnated with the following solution:

| | Parts by weight |
|---|---|
| Chloro-2-butadiene-1,3 plastic polymer | 14.28 |
| Zinc laurate | 0.725 |
| Zinc oxide | 0.725 |
| Phenyl-beta-naphthylamine | 0.22 |
| Toluene | 84.05 |

Following impregnation, the solvent is removed either by air-drying or force-drying in an oven. The chloro-2-butadiene-1,3 polymer is cured by heating the impregnated paper for 30 minutes at 121° C., although the polymer cures very satisfactorily by aging the impregnated paper for two to three days at room temperature. The impregnated paper has a ratio by weight of chloro-2-butadiene-1,3 polymer to fiber equal to 0.40. The impregnated paper has good pliability, excellent freedom from paper break, good resistance to hand tear, and Elmendorf tear of 720 grams. The impregnated paper is waterproof, and it ages well as shown by accelerated aging tests in a 65° C. oven.

Other types of paper may be treated in substantially the same way as the crinkled kraft paper in the preceding example, e. g., absorbent pliable papers made from cotton rags and the like.

This example illustrates the use of zinc laurate as a curing agent and as an acid acceptor.

Example 2.—*Crinkled kraft paper with chloro-2-butadiene-1,3 latex*

A crinkled kraft paper prepared from specially treated kraft pulp is impregnated by passing through a latex of chloro-2-butadiene-1,3 polymer of the following composition:

| | Parts by weight |
|---|---|
| Chloro-2-butadiene-1,3 polymer | 20.0 |
| Sodium oleate | 0.4 |
| Phenyl-beta-naphthylamine | 0.4 |
| Water | 79.2 |

The water is evaporated by allowing the impregnated paper to air-dry. The impregnated paper has a ratio of chloro-2-butadiene-1,3 polymer to fiber equal to 0.32, an Elmendorf tear of 500 grams, fair resistance to hand tear, and good pliability. The impregnated paper is waterproof.

Pliable absorbent papers may also be impregnated with chloro-2-butadiene-1,3 polymer modified with softeners, mineral or fatty oils, or asphalts, etc.

Thus by way of example steam refined asphalt and di(methyl cyclohexyl) adipate illustrate respectively a suitable asphalt modifying agent and a softener for crinkled kraft papers.

*Example 3.—Crinkled kraft paper treated with chloro-2-butadiene-1,3 polymer made with iodine*

Fresh chloro-2-butadiene-1,3 containing .3% iodine is allowed to stand at room temperature in diffused light for four weeks. The resulting almost colorless, plastic mass is dissolved in toluene to give a 14% solution. After the addition of 1½% of phenyl-beta-naphthylamine which readily dissolves, this solution is used to impregnate crinkled kraft paper. A product of unusual strength and good aging properties results.

This illustrates the use of a plastic chloro-2-butadiene-1,3 plastic polymer prepared by a different method than that illustrated in Example B, indicating the general utility of plastic chloro-2-butadiene-1,3 polymers for impregnation purposes.

(b) Preparation of waterproof paper

*Example 4.—Kraft paper treated with chloro-2-butadiene-1,3 polymer*

An unsized kraft paper is impregnated with the following solution of chloro-2-butadiene-1,3 polymer latex:

| | Parts by weight |
|---|---|
| Chloro-2-butadiene-1,3 polymer | 8.0 |
| Sodium oleate | 0.16 |
| Phenyl-beta-naphthylamine | 0.16 |
| Water | 91.68 |

The impregnated paper is air-dried or force-dried. The ratio by weight of chloro-2-butadiene-1,3 polymer to fibers is 0.15. The impregnated paper is waterproof, and further, the impregnation of the paper greatly improves its oil-resistance.

This example illustrates the impregnation of ordinary papers (unsized) of the industry with an aqueous dispersion of chloro-2-butadiene-1,3 polymer.

(c) Preparation of transparent paper

*Example 5.—White paper treated with chloro-2-butadiene-1,3 polymer*

A white paper prepared from specially hydrated paper pulp is impregnated with a 10% solution of chloro-2-butadiene-1,3 plastic polymer in toluene containing 1% phenyl-beta-naphthylamine based on the chloro-2-butadiene-1,3 polymer, and the paper air-dried. The impregnated paper is transparent.

II. Impregnation of woven fabrics

*Example 6.—Teal treated with chloro-2-butadiene-1,3 polymer*

Teal is a double texture fabric which consists of cotton fabric laminated together with a rubber composition.

The impregnation of Teal with chloro-2-butadiene-1,3 polymer is accomplished as follows: The Teal is cured two hours at 124° C. Then a chloro-2-butadiene-1,3 polymer composition is spread by means of a spreader knife on the surface of the Teal. The solution sinks into the surface of the cloth. Either one or both surfaces of the Teal may be coated, as desired. An impregnating composition for spread application is as follows:

| | Parts by weight |
|---|---|
| Chloro-2-butadiene-1,3 plastic polymer | 21.5 |
| Phenyl-beta-naphthylamine | 0.33 |
| Zinc oxide | 2.2 |
| Toluene | 75.97 |

The Teal is air-dried or force-dried following application of the impregnating solution, and the dried product is cured for one-half hour at 124° C. in order to cure the chloro-2-butadiene-1,3 polymer and to complete the cure of the rubber compound.

Teal which has been impregnated with chloro-2-butadiene-1,3 polymers is water-repellent, pliable, and resistant to marring when bent. Soot placed on the impregnated Teal is easily removed by washing with soap and water.

Still greater water-repellency and waterproofness of Teal may be obtained by impregnating with chloro-2-butadiene-1,3 polymer modified with wax. A suitable impregnating solution consists of 100 parts of the above solution of chloro-2-butadiene-1,3 plastic polymer to which is added 10.75 parts of Japan wax and 10.75 parts of toluene. The resulting Teal may be cleaned with gasolene without injury. Teal waterproofed with wax alone, on the other hand, can not be cleaned in this way and whitens when bent.

Various cotton fabrics may be treated in the same general manner as described in the above example. Thus, cotton sheeting passed thru a solution of plastic chloro-2-butadiene-1,3 latex, and then dried makes the fabric water-repellent without reducing its pliability substantially. The same is true of wool fabric treated for example by passing thru a solution of chloro-2-butadiene-1,3 plastic polymer and dried, followed by curing of the polymer on the fabric. Likewise a heavy felt treated as described in the preceding sentence yields an oil-resistant felt which is particularly suitable for oil packing.

*Example 7.—Cloth impregnated and coated with chloro-2-butadiene-1,3 polymer*

This example illustrates a mode of obtaining a combined impregnating and coating effect.

Cotton cloth is first wet with water, placed upon a plate of glass and saturated with an aqueous dispersion of chloro-2-butadiene-1,3 polymer, similar to that described in Example B and containing phenyl-beta-naphthylamine. A sufficient excess of the dispersion is used to completely fill the space between the cloth and the glass. After air-drying to remove the water, the cloth is readily stripped from the glass and is found to be not only thoroughly impregnated but also coated with a continuous layer of chloro-2-butadiene-1,3 polymer which on the side next to the glass presents a smooth and glossy appearance.

III. Impregnation of thread

Example 8

Linen thread is run through a bath containing a chloro-2-butadiene-1,3 polymer dispersion similar to that obtained as in Example B and containing phenyl-beta-naphthylamine. After drying, this thread is found to be more than twice as strong as when unimpregnated.

For the purposes of impregnation, where an aqueous dispersion of the polymer is used, the concentration of chloro-2-butadiene-1,3 in the aqueous dispersion should be approximately between 8% and 38% of polymer. Higher and lower percentages may be used for some purposes but in general lower percentages do not impregnate the porous material sufficiently to make a substantial change in its physical properties, while on the other hand higher concentrations make the rate of impregnation slow and yield products which for many purposes are too stiff.

Where solutions are used for impregnating, the concentration of the polymers in the impregnating solutions may be varied by varying the amount of the solvent used, and such concentration determines to a large extent the degree of impregnation. Preferred impregnating solutions in organic solvents contain from approximately 10% to approximately 20% chloro-2-butadiene-1,3, which introduce respectively into crinkled kraft paper, for example, approximately from 13% to 40% of polymer based on the weight of the crinkled kraft paper, thus indicating the effect of concentration on the amount of polymer with which a porous article can be impregnated. Higher and lower concentrations than from 10% to 20% of polymer may be used for some purposes, but as described above with respect to the effect of impregnation with aqueous dispersions of chloro-2-butadiene-1,3 polymers, lower percentages in general fail to impregnate the material sufficiently while higher percentages diminish the rate of impregnation to a considerable extent and yield products which for many purposes are too stiff.

Several of the above examples relating to the impregnation of materials with chloro-2-butadiene-1,3 plastic polymers illustrate the use of various agents which exert a curing effect on the incompletely polymerized plastic polymer. Suitable agents of this character are zinc dust, zinc oxide, zinc butyrate, zinc laurate, certain salts of copper, lead, iron, and the like. A film formed from a solution of uncured polymer containing a curing agent is cured, for example, by heating for 10 minutes at a temperature of 121° C., or by aging for two or three days at ordinary room temperatures. Properly prepared plastic chloro-2-butadiene-1,3 polymer will cure by heating in the absence of an accelerator but it is desirable in most cases to use an agent which will accelerate the cure. The curing agent is dissolved or dispersed in the solution of chloro-2-butadiene-1,3 polymer prior to the impregnation of the fabric.

It is frequently desirable to introduce stabilizing agents into the chloro-2-butadiene-1,3 polymer impregnating compositions prior to their application to fabric. Stabilizing agents for chloro-2-butadiene-1,3 polymer are classified into antioxidants and acid acceptors. The purpose of the antioxidant is to improve the aging qualities of chloro-2-butadiene-1,3 polymer by retarding its atmospheric oxidation. Some of the antioxidants which are particularly suitable for chloro-2-butadiene-1,3 polymer are phenyl-beta-naphthylamine, aniline, diphenylamine, benzidine, hydroquinone, pyrogallol and, in general, the known rubber antioxidants. The purpose of an acid acceptor is to unite with the acid which may be liberated in small amounts from chloro-2-butadiene-1,3 polymer as it ages. For this purpose, basic substances or other substances capable of combining with acids may be used, provided that they are not sufficiently basic to injure the material impregnated. Weak bases such as zinc or magnesium oxide or the salts of bases with weak acids, for example, sodium oleate, zinc laurate, calcium stearate, etc., are particularly suitable. Zinc oxide and zinc laurate serve as curing agents as well as acid acceptors. Sodium oleate and other alkali salts of weak acids inhibit the cure of chloro-2-butadiene-1,3 polymer. The addition of sodium oleate to chloro-2-butadiene-1,3 compositions is restricted, therefore, to water dispersions of cured polymers. However, the acid accepting properties of sodium oleate may be utilized in the impregnation of fabrics with solutions of uncured polymer by pretreating the fabrics with a water solution of sodium oleate, drying, and then impregnating with the solution of uncured chloro-2-butadiene-1,3 polymer. With this exception, the antioxidants and acid acceptors are in general dissolved or dispersed in the solution or suspension of chloro-2-butadiene-1,3 polymers prior to the impregnation.

The general procedure for the impregnation of fabrics with chloro-2-butadiene-1,3 solutions or suspensions is as follows: The fabrics are passed through a bath of the impregnating liquid, then between squeeze rolls or doctor knives to remove excess liquid from the surface, and then through a drying oven. If an uncured polymer is used, the impregnated fabric is heated for 10 minutes at 121° C. or aged for 2 to 3 days at ordinary room temperatures in order to cure the chloro-2-butadiene-1,3 polymer.

Other methods of impregnating fabrics, etc., may also be used. For example, a viscous solution or suspension of chloro-2-butadiene-1,3 polymer may be pressed into the fabric, or an absorbent fabric may be impregnated by flow, spray, or brush application of a chloro-2-butadiene-1,3 polymer solution or suspension. The preparation of fabric sheets consisting of paper fibers and chloro-2-butadiene-1,3 polymer may also be accomplished by adding chloro-2-butadiene-1,3 polymer latex to a paper beater containing fibers and water, precipitating the chloro-2-butadiene-1,3 polymer from the latex onto the surface of the fibers by adding a precipitating agent, such as alum, and then forming a sheet from the treated pulp in accordance with regular paper practice.

The impregnating solution may also be a water dispersion of a soluble uncured chloro-2-butadiene-1,3 polymer, or a water dispersion of an organic solution of chloro-2-butadiene-1,3 polymer.

Furthermore, instead of the polymers of chloro-2-butadiene-1,3 described above, a great variety of modified polymers disclosed in the above-identified applications may be used to produce impregnated materials of various properties. Thus, we may use either dispersions or solutions of chloro-2-butadiene-1,3 polymerized in the presence of solvents (either volatile, or non-volatile), oils (either drying or non-drying and of animal, mineral, or vegetable origin), resins (either natural or synthetic), gum, waxes, asphalts, and similar substances, inhibitors of polymerization, sulfur and organic sulfur compounds, and substances (such as isoprene) which are themselves capable of polymerization. In the case of the aqueous dispersions, proteins and water-soluble gums and resins may also be used. The methods suitable for the preparation of such modified polymers are disclosed in the above-identified applications. Alternatively, the oils, resins, waxes, softeners, asphalts, cellulose derivatives such as esters, ethers, etc., may be incorporated, for example, by solution or dispersion with the chloro-2-butadiene-1,3 polymers subsequent to their formation and may thus be used to modify the properties of the impregnated materials.

Some uses for papers and fabrics impregnated with chloro-2-butadiene-1,3 polymers are as follows:

Pliable, absorbent papers impregnated with chloro-2-butadiene-1,3 are useful as paper backings for pyroxylin coated products and for rubber coated products, as a base for automobile top material, as material for shoes, including shoe counters, caps, and uppers, as material for electrical insulation, and as material for bookbinding. Ordinary paper impregnated with chloro-2-butadiene-1,3 polymer is useful for waterproof paper, waterproof paper bags and containers, and oil-resistant paper. Special types of white paper impregnated with chloro-2-butadiene-1,3 polymer are useful as transparent paper for use in envelopes, etc. Woven fabrics impregnated with chloro-2-butadiene-1,3 polymer are useful for tents, awnings, tarpaulins, automobile top material, clothing, Teal, hospital sheeting, etc. Felt impregnated with chloro-2-butadiene-1,3 polymer is useful for oil packings.

Another material of not completely impermeable nature is regenerated cellulose, the permeability of the ordinary variety of which is for some purposes undesirable. Chloro-2-butadiene-1,3 polymer compositions may be used so to coat and impregnate this material as to increase greatly its impermeability to moisture, water, grease, oils, gases, odors, and the like.

It has been found that the particles of the polymer in aqueous dispersions of chloro-2-butadiene-1,3 polymers, are much finer and more uniform in size than those of natural latex. To this fact we ascribe the more thorough impregnation obtained with the chloro-2-butadiene-1,3 dispersion.

B. *Coating and finishing with chloro-2-butadiene-1,3 polymers*

Chloro-2-butadiene-1,3 polymer compositions, in addition to their utility in the art of impregnation, are particularly adaptable to the coating and finishing of flexible and semi-rigid material. Specifically this phase of the invention relates to the coating and finishing of fabrics and papers in which chloro-2-butadiene-1,3 polymer compositions are applied to the fabric or paper base, and to the finishing of rubber, leather, automobile material, etc., with chloro-2-butadiene-1,3 polymer coating compositions. The chloro-2-butadiene-1,3 coating compositions may be in the form of plastic pastes, emulsions, lacquers, varnishes, and enamels, and may be applied by spread, calender, dip, flow, brush or spray applications.

The following examples are given to illustrate the coating and finishing of materials with chloro-2-butadiene-1,3 polymer compositions:

IV. *Finishing by calendering of chloro-2-butadiene-1,3 compounds*

These examples illustrate the preparation of coated fabric in which a chloro-2-butadiene-1,3 polymer compound is calendered to the base. They also illustrate the application of chloro-2-butadiene-1,3 polymer cement to the fabric to promote anchorage of the chloro-2-butadiene-1,3 polymer compound when calendered to the fabric base.

*Example 9.—Cloth coated with chloro-2-butadiene-1,3 polymer*

The following composition containing chloro-2-butadiene-1,3 polymer is prepared by milling the ingredients into the polymer in the order given.

| | Parts by weight |
|---|---|
| Chloro-2-butadiene-1,3 plastic polymer | 76.64 |
| Mineral oil | 1.58 |
| Phenyl-beta-naphthylamine | 1.18 |
| Stearic acid | 0.8 |
| Zinc oxide | 19.8 |

Mineral oil softens the compound, stearic acid aids the dispersions of zinc oxide in the polymer, phenyl-beta-naphthylamine improves the aging quality of the compound, and zinc oxide serves as an accelerator of curing and as an acid acceptor.

The compound is calendered on a cloth to which an anchorage coat has been applied by spread application of a chloro-2-butadiene-1,3 cement consisting of equal parts by weight of the above polymer compound and xylene. The coated fabric is cured ten minutes at 121° C. The coated fabric has good appearance, excellent pliability, and good resistance to abrasion. It is oil-proof, waterproof, resistant to phenol solutions, and flexible even at −40° C.

The suitability of this type of coated cloth for use as liners for rubber has been demonstrated by showing that uncured rubber compounds do not adhere to it.

*Example 10.—Strong pliable paper backing impregnated with rubber latex and coated with polymer*

The chloro-2-butadiene-1,3 polymer compound described in Example 9 is calendered on crinkled kraft paper which has been impregnated with rubber latex (the paper backing consists of 67% by weight of crinkled kraft paper fiber and 33% by weight of rubber). The coated crinkled kraft paper, after curing according to the manner described is very pliable, waterproof, oil-proof, and has good appearance.

*Example 11.—Strong pliable paper backing impregnated and then coated with polymer*

The chloro-2-butadiene-1,3 polymer compound described in Example 9 is calendered on crinkled kraft paper which has been impregnated with chloro-2-butadiene-1,3 polymer (the paper backing consists of 70% by weight of crinkled kraft paper fibers, and 30% by weight of chloro-2-butadiene-1,3 polymer, zinc oxide, and phenyl-beta-naphthylamine). The chloro-2-butadiene-1,3 polymer coating is then cured. The properties of the coated paper backing are similar to those cited for Example 10.

*Example 12.—Cloth coated with highly pigmented polymer*

This example utilizes a chloro-2-butadiene-1,3 polymer compound highly filled with pigments and wax, and having the following composition:

| | Parts by weight |
|---|---|
| Chloro-2-butadiene-1,3 plastic polymer | 37.64 |
| Mineral oil | 0.78 |
| Phenyl - beta - naphthylamine | 0.58 |
| Montan wax | 4.9 |
| Stearic acid | 0.5 |
| Thermatomic black | 3.43 |
| Barytes | 20.5 |
| Zinc oxide | 9.77 |
| Clay | 21.9 |

The purposes of the various ingredients are as follows: Mineral oil softens the compound, phenyl-beta-naphthylamine serves as an antioxidant, thermatomic black colors the compound, Montan wax improves the water-repellency of the compound, stearic acid improves the dispersion of pigments in the polymer, zinc oxide serves both as an accelerator of vulcanization and as an acid acceptor, and clay and barytes are filling pigments.

The composition is calendered on cloth to which an anchorage coat has been applied as in Example 9. The coated cloth is finished with a water varnish consisting of shellac dissolved in ammoniacal water and applied by passing the coated cloth over the top of a roll, the bottom part of which runs in a bath of the varnish. The varnish coat removes the slight tack from the surface of the coating, which tack may be alternatively eliminated by air-drying for one day, as in the next example. The coated fabric is then embossed, and the chloro-2-butadiene-1,3 polymer compound cured by heating the coated fabric for ten minutes at 121° C.

*Example 13.—Pliable paper backing coated with highly pigmented polymer*

The chloro-2-butadiene-1,3 polymer composition described in Example 12 is calendered to crinkled kraft paper which has been impregnated with chloro-2-butadiene-1,3 polymer (ratio of polymer to crinkled kraft paper fiber=0.27). The coated fabric may be finished by allowing to air-cure for one day at room temperature and then embossing with a skiver grain. The embossed product has an excellent appearance and feel. The fact that the coated fabric can be embossed without the coating sticking after aging for one day demonstrates the rapid cure of highly pigmented chloro-2-butadiene-1,3 polymer compounds and their freedom from surface tack, when cured.

*Example 14.—Cloth coated with highly pigmented polymer and mineral rubber*

This example utilizes a chloro-2-butadiene-1,3 compound of the following character:

| | Parts by weight |
|---|---|
| Chloro-2-butadiene-1,3 plastic polymer | 24.125 |
| Mineral oil | 0.5 |
| Phenyl - beta - naphthylamine | 1.375 |
| Mineral rubber (blown asphalt) | 20.0 |
| Stearic acid | 0.25 |
| Thermatomic black | 5.0 |
| Zinc oxide | 6.25 |
| Clay | 43.5 |

This compound is prepared by first milling mineral rubber into chloro-2-butadiene-1,3 plastic polymer containing mineral oil and phenyl-beta-naphthylamine; then stearic acid, then thermatomic black, and finally the zinc oxide and clay as a mixture. The addition of mineral rubber illustrates the use of bitumins in chloro-2-butadiene-1,3 polymer compounds. The purpose of the other constituents is the same as in former examples.

This compound is calendered on cloth to which an anchorage coat has been applied as in Example 9. A coat of shellac varnish is then applied to the surface of the chloro-2-butadiene-1,3 polymer coating in order to eliminate slight surface tack and thus to permit rolling the coated fabric without the coating picking up lint. The coated fabric is then embossed if desired. Also, the coated cloth either embossed or unembossed may be finished with various types of varnishes and used as top material for automobiles, decks, etc.

*V. Finishing by the use of coating jellies containing chloro-2-butadiene-1,3 polymer*

These examples illustrate the preparation of coated fabrics in which various types of chloro-2-butadiene-1,3 polymer coating jellies have been spread on the base.

*Example 15.—Pigmented coating jelly*

The following millbase is made by grinding in a ball mill and is then used in the preparation of the coating jelly:

Millbase

| | Parts by weight |
|---|---|
| Chloro-2-butadiene-1,3 plastic polymer | 7.0 |
| Boneblack | 25.3 |
| Toluene | 67.7 |

Chloro-2-butadiene-1,3 polymer coating jelly

| | |
|---|---|
| Millbase | 100.0 |
| Chloro-2-butadiene-1,3 plastic polymer | 55.0 |
| Zinc oxide | 6.5 |
| Phenyl - beta - naphthylamine | 1.0 |
| Ethyl acetate | 47.0 |
| Butyl acetate | 8.0 |

Cloth coated with this composition is pliable, resistant to abrasion, and durable. The coating has a medium to low gloss and adheres firmly to the base. Crinkled kraft paper impregnated with chloro-2-butadiene-1,3 polymer may also be coated with this composition.

*Example 16.—Jelly containing polymer and nitrocellulose*

The following composition is prepared and applied as in Example 15:

Millbase

| | Parts by weight |
|---|---|
| Boneblack | 100.0 |
| Chloro-2-butadiene-1,3 plastic polymer | 19.2 |
| Ethyl acetate | 181.8 |
| Butyl acetate | 3.8 |

Coating jelly

| | |
|---|---|
| Millbase | 76.2 |
| Chloro-2-butadiene-1,3 plastic polymer | 48.0 |
| Phenyl - beta - naphthylamine | 0.79 |
| Cellulose nitrate | 8.8 |
| (of intermediate viscosity) | |
| Zinc oxide | 5.3 |
| Butyl acetate | 58.0 |
| Ethyl acetate | 194.0 |

The incorporation of pyroxylin into the chloro-2-butadiene-1,3 polymer composition gives a drier coating, but decreases the gloss and pliability of the coating.

*Example 17.—Jelly containing polymer and modified glyptal resin*

The following composition is prepared and applied as in Example 15:

*Millbase*

| | Parts by weight |
|---|---|
| Boneblack | 29.4 |
| Chloro-2-butadiene-1,3 polymer | 5.0 |
| Ethyl acetate | 55.6 |
| Butyl acetate | 10.0 |

*Coating composition*

| | |
|---|---|
| Millbase | 100.0 |
| Chloro-2-butadiene-1,3 polymer-glyptal resin* | 65.0 |
| Zinc oxide | 5.5 |
| Phenyl - beta - naphthylamine | 0.67 |
| Toluene | 24.5 |

\* The glyptal resin is prepared by heating in an open kettle 19.87 parts by weight of glycerol, 36.52 parts by weight of phthalic anhydride, 31.15 parts by weight of linseed oil acids, and 12.46 parts by weight of China-wood oil acids. The heating schedule is one hour up to 437° F., and two hours at 437° F. The batch is slowly blown with carbon dioxide during the two hours of heating at 437° F. The resin has an acid number between 35 and 40.

The chloro-2-butadiene-1,3 polymer-glyptal resin combination is made as follows: 15 parts by weight of a modified glyptal resin (containing 14% of China-wood oil and 35% of linseed oil) and 35 parts of chloro-2-butadiene-1,3 are heated in toluene solution for 3 hours at 100° C. After removal of the unpolymerized chloro-2-butadiene-1,3 by distillation, an appropriate amount of the resulting toluene solution of resin is used in the preparation of the coating composition.

A coating spread from this composition is very pliable, tough, and durable, but retains considerable tack after evaporation of the solvent. Consequently the fabric cannot be rolled before the coating has been thoroughly cured.

*Example 18.—Jelly containing polymer and wood flour*

The following composition is prepared and applied as in Example 15:

*Millbase*

| | Parts by weight |
|---|---|
| Boneblack | 50.0 |
| Wood flour | 100.0 |
| Chloro-2-butadiene-1,3 plastic polymer | 12.5 |
| Toluene | 137.5 |
| Ethyl acetate | 162.0 |

*Coating composition*

| | |
|---|---|
| Millbase | 100.0 |
| Chloro-2-butadiene-1,3 plastic polymer | 22.0 |
| Zinc oxide | 2.5 |
| Phenyl-beta-naphthylamine | 0.375 |
| Ethyl acetate | 35.0 |
| Butyl acetate | 5.0 |

Cloth coated with this composition is flexible and resistant to abrasion. The incorporation of wood flour in chloro-2-butadiene-1,3 polymer compositions gives the coating a dull and dry finish.

*Example 19.—Preparation of window shades*

*Millbase*

| | Parts by weight |
|---|---|
| Titanox | 25.0 |
| Clay | 30.8 |
| Zinc oxide | 10.7 |
| Sienna | 3.3 |
| Turkey umber | 0.3 |
| Chloro-2-butadiene-1,3 plastic polymer | 14.0 |
| Toluene | 171.6 |

*Coating jelly*

| | |
|---|---|
| Millbase | 255.7 |
| Chloro-2-butadiene-1,3 plastic polymer | 91.0 |
| Phenyl-beta-naphthylamine | 1.6 |
| Ethyl acetate | 161.0 |
| Butyl acetate | 28.0 |

Both sides of a loosely woven fabric are coated by spread application of the coating with a sharp spreader knife. The coating is nearly tack-free on evaporation of the solvent, and is entirely tack-free after aging for several hours at room temperature. The finished product has the desirable properties of the coated fabrics already described and is particularly suitable for window shade material.

*VI. Finishing materials with dispersions of chloro-2-butadiene-1,3 polymer*

These examples illustrate the use of chloro-2-butadiene-1,3 polymer latex, with or without shellac and clay, as finishes for rubber.

*Example 20.—Leatherette coated with chloro-2-butadiene-1,3 latex*

The following chloro-2-butadiene-1,3 polymer composition is applied by means of a spreader knife to the coated surface of a rubber coated fabric (uncured leatherette) in which a rubber compound has been calendered to a cloth base.

| | Parts by weight |
|---|---|
| Chloro-2-butadiene-1,3 polymer | 12.0 |
| Sodium oleate | 0.25 |
| Water | 87.75 |

The rubber fabric thus coated with chloro-2-butadiene-1,3 polymer is then heated for 1½ hours at 121° C. in order to cure the rubber compound. Following the cure, the surface of the coating may be brominated by flow application of a 3% solution of bromide in carbon tetrachloride. This treatment gives the surface more slip and more resistance to marring when scrubbed.

*Example 21.—Leatherette coated with chloro-2-butadiene-1,3 latex containing shellac*

Uncured leatherette (rubber coated fabric) is coated by spread application of the following chloro-2-butadiene polymer composition, prepared by dissolving the shellac in the water and ammonium hydroxide, adding the sodium oleate, then dispersing the chloro-2-butadiene-1,3 and allowing it to polymerize in the usual manner.

| | Parts by weight |
|---|---|
| Chloro-2-butadiene-1,3 polymer | 9.0 |
| Shellac | 3.0 |
| Sodium oleate | 0.2 |
| Concentrated ammonium hydroxide sol | 8.0 |
| Water | 79.8 |

The leatherette is then cured 1½ hours at 121° C. Following the cure, the surface of the coating is brominated as described above.

Leatherette finished in this manner has excellent gloss and surface slip and good resistance to marring when scrubbed.

*Example 22.—Leatherette coated with chloro-2-butadiene-1,3 latex containing clay*

| | Parts by weight |
|---|---|
| Chloro-2-butadiene-1,3 polymer | 9.0 |
| Shellac | 3.0 |
| Sodium oleate | 0.2 |
| Water | 87.8 |
| Clay | 9.6 |

The clay is stirred into the chloro-2-butadiene-1,3 polymer-shellac dispersion. The purpose of the clay is to improve the dryness of the chloro-2-butadiene-1,3 polymer-shellac coating, and also to produce a dull finish. The finish is free from surface tack. The leatherette finished with the above composition is then cured by heating 1½ hours at 121° C. When brominated the coating has excellent surface slip and excellent resistance to marring when scrubbed.

In a similar manner pyroxylin coated materials can be coated with the compositions comprising the polymer described in the present application.

VII. Finishing by the use of lacquers, varnishes, and enamels containing chloro-2-butadiene-1,3 polymer

*Example 23.—Finishing paper with chloro-2-butadiene-1,3 polymer containing paraffin*

Kraft paper is coated with the following composition:

| | Parts by weight |
|---|---|
| Chloro-2-butadiene-1,3 plastic polymer | 25.0 |
| Paraffin | 2.5 |
| Zinc oxide | 2.5 |
| Phenyl-beta-naphthylamine | 0.375 |
| Toluene | 80.0 |

The composition is applied to the paper by means of a spreader knife and the solvent evaporated by heating in an oven at approximately 100° C. The coated paper is exceedingly moisture-oil-and waterproof and very flexible.

*Example 24.—Preparation of wall paper coated with chloro-2-butadiene-1,3 polymer*

A chloro-2-butadiene-1,3 polymer lacquer for coating wall paper is prepared as follows:

| | Parts by weight |
|---|---|
| Chloro-2-butadiene-1,3 plastic polymer | 13.0 |
| Toluene | 117.0 |
| Zinc oxide | 1.3 |
| Phenyl-beta-naphthylamine | 0.15 |

Wall paper is finished as follows: One coat of the lacquer is brushed on unfinished wall paper. The lacquer dries tack-free in a few hours to give a flexible finish of medium gloss. Dry ink spots and vaseline can be removed from the coated paper without leaving spots by washing with soap and water.

*Example 25.—Finishing leather with lacquer containing chloro-2-butadiene-1,3, polymer*

A chloro-2-butadiene-1,3 lacquer for finishing leather is as follows:

| | Parts by weight |
|---|---|
| Chloro-2-butadiene-1,3 polymer | 26 |
| Toluene | 234 |
| Zinc oxide | 2.6 |
| Phenyl-beta-napthylamine | 0.3 |

The lacquer is brushed on unfinished leather or on leather which has been previously dyed. The lacquer gives a finish which has practically no gloss, and even when vigorously rubbed with a cloth the finish becomes only slightly glossy. The chloro-2-butadiene-1,3 coating also improves the water and grease repellency of the leather. The coating is flexible and adheres strongly to the leather base.

*Example 26.—Finishing leather with an enamel containing chloro-2-butadiene-1,3 polymer*

A chloro-2-butadiene-1,3 enamel for coating leather is prepared as follows:

Millbase

| | Parts by weight |
|---|---|
| Carbon black | 1 |
| Chloro-2-butadiene-1,3 plastic polymer | 6 |
| Toluene | 36 |
| Phenyl-beta-naphthylamine | 0.06 |

Enamel

| | |
|---|---|
| Millbase | 169 |
| Zinc oxide | 2.8 |
| Xylene | 223.8 |

The enamel is brushed on unfinished leather and on leather which has previously been dyed. The enamel dries tack-free in a few hours to give a flexible finish which adheres well to the leather. The enamel has a dull appearance and is impermeable to water. The enamel finish does not become glossy when rubbed.

As solvents, curing agents, and stabilizing agents for the above compositions we may use any of those enumerated above in connection with impregnation. Similarly, instead of the pure polymers themselves, we may use any of the modified polymers described above in this connection, the modifying agents being added either before, during or after polymerization of the chloro-2-butadiene-1,3. When added after polymerization they may be incorporated by the methods already described, such as solution or dispersion by grinding or milling. As pigments and fillers we may use any of the substances used for such purposes in the arts of enamel and rubber compounding such as titanium oxide, lead chromate, lithopone, zinc oxide, iron oxide, carbon black, bone black, umber, clay, barytes, and wood flour. They may be incorporated by milling, grinding, and other methods, known to the art.

The chloro-2-butadiene-1,3 polymer coating compositions may, if desired, be modified with resins other than those mentioned, such as rosin, ester gum, various modified polyhydric alcohol-polybasic acid resins, coumarone, Amberol, phenol-formaldehyde type resins, polychlorinated diphenyl or naphthalene resins, meta styrene, drying oils, etc. It may be desirable in certain cases to apply finishing coats to chloro-2-butadiene-1,3 polymer coatings. For example, casein finishes, resin finishes, or pyroxylin finishes which adhere satisfactorily to chloro-2-butadiene-1,3 polymer coatings may be used for this purpose.

The examples have illustrated the spread, calender, and brush application of chloro-2-butadiene-1,3 polymer coatings. The lacquers and enamels may also be applied by spray or flow application and, in cases where both surfaces of the fabric are to be finished, by dip application.

Chloro-2-butadiene-1,3 polymer coated fabrics are useful in general wherever pyroxylin coated fabrics and rubber coated fabrics may be used, for example, in the manufacture of book-binding materials, window shades, shower curtains, automobile top materials, liners for sheeted rubber, oil and grease proof coverings for automobile springs, Teal, suit cases, trunk linings, belts, hospital sheeting, clothing, e. g., clothing protective against toxic gases, rug anchors, electrical insulations, etc. Chloro-2-butadiene-1,3 polymer coatings are also useful for coating balloon cloths, and for aeroplane taut coatings. Chloro-2-butadiene-1,3 polymer coated papers are useful for the preparation of waterproof and oil-proof wrapping paper, paper bags, and other paper containers. Chloro-2-butadiene-1,3 polymer-paraffin coatings are especially useful for the preparation of an exceedingly moisture-proof type of paper. Chloro-2-butadiene-1,3 polymer coatings are also useful as dressings for leather and automobile top material, and as protective waterproof finishes for wall paper, currency, and shot-shells.

An outstanding advantage of chloro-2-butadiene-1,3 polymer coatings is that they are oil-proof. In comparison with rubber coatings, chloro-2-butadiene-1,3 polymer coatings are more oil-proof, cure more readily, are not as sensitive to over cure; when embossed they have better definition of grain and retain the grain for a longer time. In comparison with pyroxylin coatings containing castor oil or other softeners, chloro-2-butadiene-1,3 polymer coatings are not subject to exudation and have better flexibility at low temperatures. A coating consisting of chloro-2-butadiene-1,3 polymer and paraffin is unique in being moisture-proof, waterproof, oil-proof, and flexible.

C. Oil-proofing with chloro-2-butadiene-1,3 polymer

Some mention has been made of the oil-proofing qualities conferred upon materials which have been treated with chloro-2-butadiene-1,3 polymer. Paper, cloth and other fabrics may be effectively oil-proofed by coating with chloro-2-butadiene-1,3 polymer compositions by the methods already described.

Sodium silicate is used in the paper industry for oil-proof coatings. The silicate coatings, however, are extremely brittle, and consequently crack and flake from the base. Further, the silicate coatings are water sensitive. Casein coatings and pyroxylin coatings are open to the same objection of being too brittle.

The following examples illustrate various preferred modes of oil-proofing materials by means of a coating of chloro-2-butadiene-1,3 polymer.

VIII. Oil-proofing paper

Most of the examples of paper coated or impregnated with the polymer already given are remarkably oil-proof. The following examples further illustrate this process of oil-proofing.

Example 27

Unsized kraft paper is oil-proofed by spreading with a chloro-2-butadiene-1,3 solution having the following composition and curing in the usual manner.

| | Parts by weight |
|---|---|
| Chloro-2-butadiene-1,3 plastic polymer | 27.7 |
| Phenyl-beta-naphthylamine | 0.42 |
| Zinc oxide | 2.5 |
| Toluene | 74.5 |

Coated paper prepared in this manner is oil-proof. It is 14 times more resistant to the penetration of turpentine than required by the specifications of the paper industry for oil-proof paper.

IX. Oil-proofing paper containers

Example 28.—Paper containers coated with polymer

A paper container is coated by flow application with the chloro-2-butadiene-1,3 polymer solution used in Example 25. A single coat applied to the inside is sufficient to oil-proof the container. A container coated on the inside and outside is waterproof as well as oil-proof.

Example 29.—Paper containers coated with polymer and casein

| | Parts by weight |
|---|---|
| Chloro-2-butadiene-1,3 polymer | 11.5 |
| Casein | 11.5 |
| Sodium oleate | 0.23 |
| Aqua ammonia (0.90 sp. gr.) | 2.5 |
| Water | 74.27 |

The above dispersion is prepared by dispersing the chloro-2-butadiene-1,3 in an aqueous solution of the other ingredients and allowing the chloro-2-butadiene-1,3 to polymerize in the manner illustrated in Example A.

The paper container is coated as in the preceding example, and has similar properties.

Example 30.—Paper containers coated with polymer and glyptal resin

| | Parts by weight |
|---|---|
| Chloro-2-butadiene-1,3 polymer-glyptal resin combination used in Example 17 | 15.70 |
| Zinc oxide | 0.72 |
| Toluene | 83.58 |

The container is coated on the inside and on the outside, then air-dried or force dried. The coated container is oil-proof and waterproof.

X. Oil-proofing cloth

The products of Examples 9, 14, and 15 may be cited as coated fabrics which are unusually oil-proof.

XI. Lamination of paper

Example 31

| | Parts by weight |
|---|---|
| Chloro-2-butadiene-1,3 plastic polymer | 21.5 |
| Zinc oxide | 8.62 |
| Phenyl-beta-naphthylamine | 0.32 |
| Toluene | 69.56 |

The procedure for laminating paper is as follows: A sheet of paper (chip-board) is coated with the above compositions by means of a spreader knife. A second sheet of chip-board is pressed onto the coated side of the first sheet immediately following application of the coating. The laminated paper thus prepared is then dried to remove the solvent. The chloro-2-butadiene- 1,3 polymer is then cured by allowing the laminated paper to age for two to three days at room temperature or by heating for 10 minutes at 121° C. The inner layer of chloro-2-butadiene-1,3 polymer is very resistant to the passage of oil, grease, etc.

This method of oil-proofing by lamination is of interest to the foodstuffs industry in cases where the container must be impermeable to oil or grease, but where it is not desirable to place the coating on the surface of the container.

The chloro-2-butadiene-1,3 polymer oil-proof coating compositions may be mixed with any pigment or any film-forming material which does not substantially impair the oil-proofness of the coating and which is capable of being dispersed in the chloro-2-butadiene-1,3 polymer compositions. An example is the incorporation of sodium silicate into chloro-2-butadiene-1,3 polymer latex. Furthermore, any of the chloro-2-butadiene polymer compositions with or without modifying agents disclosed in the preceding sections of this application may be used in the preparation of oil-proof articles, provided that the said modifying agent does not substantially impair the oil resistance.

The chloro-2-butadiene-1,3 polymer oil-proof coating may be applied by spraying or brushing, as well as by spreading, calendering, flowing, or dipping, as disclosed in the examples.

The various features of the invention have been described particularly with relation to the treatment of fibrous material, e. g., cloth, paper, etc. Although the treatment of fibrous material is emphasized, the invention is applicable to the impregnation and coating of other species of porous material such as wood, porous brick, cement, concrete, porous stoneware and the like. The broadest aspect of the invention will therefore include within its scope the treatment of these latter named substances according to the methods described above in connection with the treatment of fibrous material.

All of the above examples deal with the halogen-substituted butadiene known as chloro-2-butadiene-1,3. However, similar halogen substituted butadienes, such as bromo-2-butadiene-1,3 are generally applicable for use in coating, impregnating and finishing compositions in the same way as chloro-2-butadiene-1,3. The preparation of bromo-2-butadiene-1,3 and its polymerizing tendencies are disclosed in the Carothers and Collins application Serial No. 409,538 noted above. The preparation of dispersions of bromo-2-butadiene-1,3 polymers is described in the Collins application noted above. These compositions are prepared according to the same general method. The invention will be considered as including within its scope all halogen-2-butadiene-1,3 compounds for the purposes described.

The above description and specific examples are to be taken as illustrative only. Any variation or departure therefrom which conforms to the spirit of the invention is intended to be included within the scope of the claims.

We claim:

1. In the process of treating a material, the step which comprises applying to the surface of said material a composition of a suitable fluid consistency containing a halogen-2-butadiene-1,3 polymer and a modifying agent.

2. In the process of treating a material, the step which comprises applying to the surface of said material a composition of a suitable fluid consistency containing a chloro-2-butadiene-1,3 polymer and a modifying agent.

3. The process of treating material which comprises applying to the surface of said material a composition containing a solution of a chloro-2-butadiene-1,3 polymer, and thereafter removing the solvent from said composition whereby permanently to affix said polymer to said material.

4. The process of treating material which comprises applying to the surface of said material a composition containing a solution of a chloro-2-butadiene-1,3 polymer and a modifying agent, and thereafter removing the solvent from said composition whereby permanently to affix said polymer to said material.

5. The process of treating material which comprises applying to the surface of said material a composition containing a solution of a plastic chloro-2-butadiene-1,3 polymer, thereafter removing the solvent from said composition whereby permanently to affix said polymer to said material, and subsequently curing said polymer.

6. The process of treating material which comprises applying to the surface of said material a composition containing a liquid dispersion of a completely polymerized chloro-2-butadiene-1,3 polymer, and thereafter removing said dispersing medium whereby permanently to affix said polymer to said material.

7. The process of treating material which comprises applying to the surface of said material a composition containing a liquid dispersion of a completely polymerized chloro-2-butadiene-1,3 polymer and a modifying agent, and thereafter removing said dispersing medium whereby permanently to affix said polymer to said material.

8. A process of treating fibrous or porous material which comprises impregnating said material with a composition containing a chloro-2-butadiene-1,3 polymer carried in a fluid of low viscosity, then removing said fluid whereby permanently to affix the polymer to the fibers of said material.

9. A process of treating fibrous or porous material which comprises impregnating said material with a composition having a fluidity sufficiently high to thoroughly impregnate said material and containing a chloro-2-butadiene-1,3 polymer carried in a fluid of low viscosity, then removing said fluid whereby permanently to affix the polymer to the fibers of said material.

10. A process of treating fibrous or porous material which comprises impregnating said material with a composition containing a chloro-2-butadiene-1,3 polymer dissolved in a low viscosity solvent, said polymer being dissolved in an amount not exceeding that which will permit thorough impregnation, then removing said solvent whereby permanently to affix the polymer to the fibers of said material.

11. A process of treating fibrous or porous material which comprises impregnating said material with a composition containing an aqueous dispersion of a chloro-2-butadiene-1,3 polymer, said polymer being present in said dispersion in an amount not exceeding that which will permit thorough impregnation, then removing the water whereby to affix the polymer permanently to the fibers of said material.

12. In the process of treating fibrous or porous composite material, the step which comprises applying to the surface of said composite material a coating composition containing a chloro-2-butadiene-1,3 polymer.

13. The process of treating fibrous or porous composite material which comprises applying to the surface of said composite material a coating composition containing a solution of a chloro-2-butadiene-1,3 plastic polymer, removing the solvent from said coating composition, and then curing said polymer.

14. The process of treating fibrous or porous composite material which comprises applying to the surface of said composite material a coating composition containing an aqueous dispersion of a chloro-2-butadiene-1,3 polymer, then removing the water from said coating composition.

15. The process as described in claim 12, further characterized in that the coating composition contains a modifying agent for the polymer.

16. In the process of treating fabricated fibrous material which is not substantially oil-proof, the step which comprises applying to the surface of said material a substantial amount of chloro-2-butadiene-1,3 polymer.

17. The process of treating fabricated fibrous material which is not substantially oil-proof which comprises applying to the surface of said material a substantial amount of chloro-2-butadiene-1,3 polymer carried in a volatile fluid vehicle, then driving off the vehicle from said polymer.

18. Fibrous or porous material impregnated with a halogen-2-butadiene-1,3 polymer.

19. Material coated with a halogen-2-butadiene-1,3 polymer.

20. Fibrous or porous material coated with halogen-2-butadiene-1,3 polymer and having substantial oil-resistant qualities.

21. Fibrous or porous material impregnated with a chloro-2-butadiene-1,3 polymer.

22. Material coated with a chloro-2-butadiene-1,3 polymer.

23. Fibrous or porous material coated with chloro-2-butadiene-1,3 polymer and having substantial oil-resistant qualities.

24. A fibrous or porous material treated with a chloro-2-butadiene-1,3 polymer composition.

25. A woven fabric treated with a chloro-2-butadiene-1,3 polymer composition.

26. A sheet composed of matted fibres which has been treated with a chloro-2-butadiene-1,3 polymer composition.

27. A sheet of matted asbestos fibres which has been impregnated with a chloro-2-butadiene-1,3 polymer composition.

28. Paper treated with a chloro-2-butadiene-1,3 polymer composition.

29. Cloth treated with a chloro-2-butadiene-1,3 polymer composition.

30. Absorbent paper, formed of crinkled fibres, and coated with a chloro-2-butadiene-1,3 polymer composition.

31. A greaseproof, waterproof, transparent paper prepared by impregnating a sheet of paper with a chloro-2-butadiene-1,3 polymer composition.

32. A waterproof and greaseproof paper prepared by coating a sheet of paper with a chloro-2-butadiene-1,3 polymer composition.

33. Cloth coated with a chloro-2-butadiene-1,3 polymer composition.

34. A product as described in claim 32, characterized in that the chloro-2-butadiene-1,3 polymer composition contains a pigment.

35. Rubber coated fabric, coated with a chloro-2-butadiene-1,3 polymer composition.

36. Paper coated with a pigmented chloro-2-butadiene-1,3 polymer composition.

37. A liquid composition comprising a solution of chloro-2-butadiene-1,3 polymer in an added volatile solvent, an inhibitor of polymerization and a paint and varnish adjunct of the class consisting of drying oils, resins, pigments, cellulose derivatives, waxes and asphalts.

38. A liquid composition comprising a solution of halogen-2-butadiene-1,3 polymer in an added volatile solvent, an inhibitor of polymerization and a paint and varnish adjunct of the class consisting of drying oils, resins, pigments, cellulose derivatives, waxes and asphalts.

39. An article of manufacture made from a material of the type set forth in claim 24.

ARNOLD M. COLLINS.
LOUIS L. LARSON.